June 16, 1953 J. B. DUBE 2,642,273
APPARATUS FOR PRODUCING LIGHTWEIGHT AGGREGATES
Original Filed Aug. 23, 1950 3 Sheets-Sheet 1
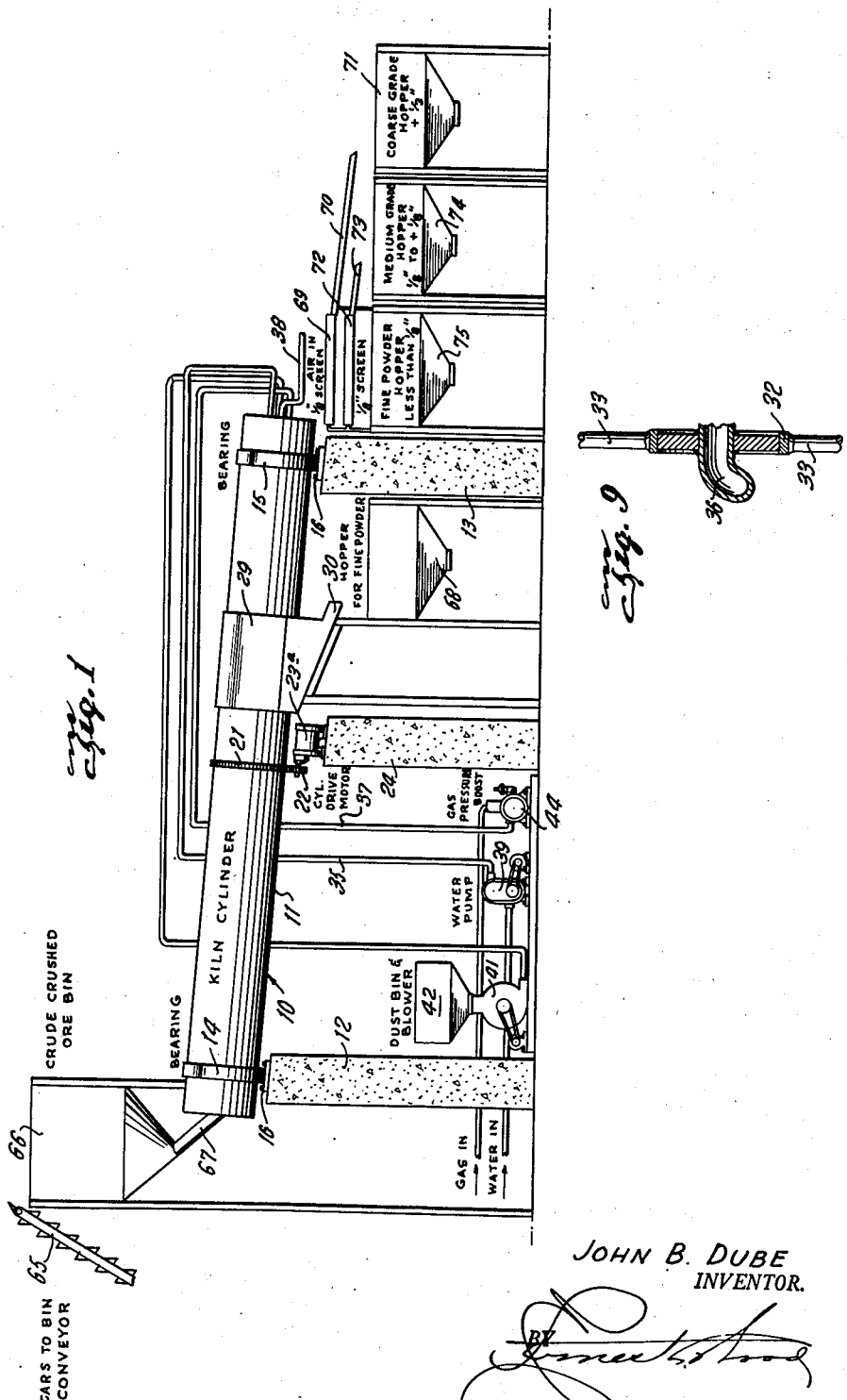
JOHN B. DUBE
INVENTOR.
ATTORNEY June 16, 1953 J. B. DUBE 2,642,273
APPARATUS FOR PRODUCING LIGHTWEIGHT AGGREGATES
Original Filed Aug. 23, 1950 3 Sheets-Sheet 2
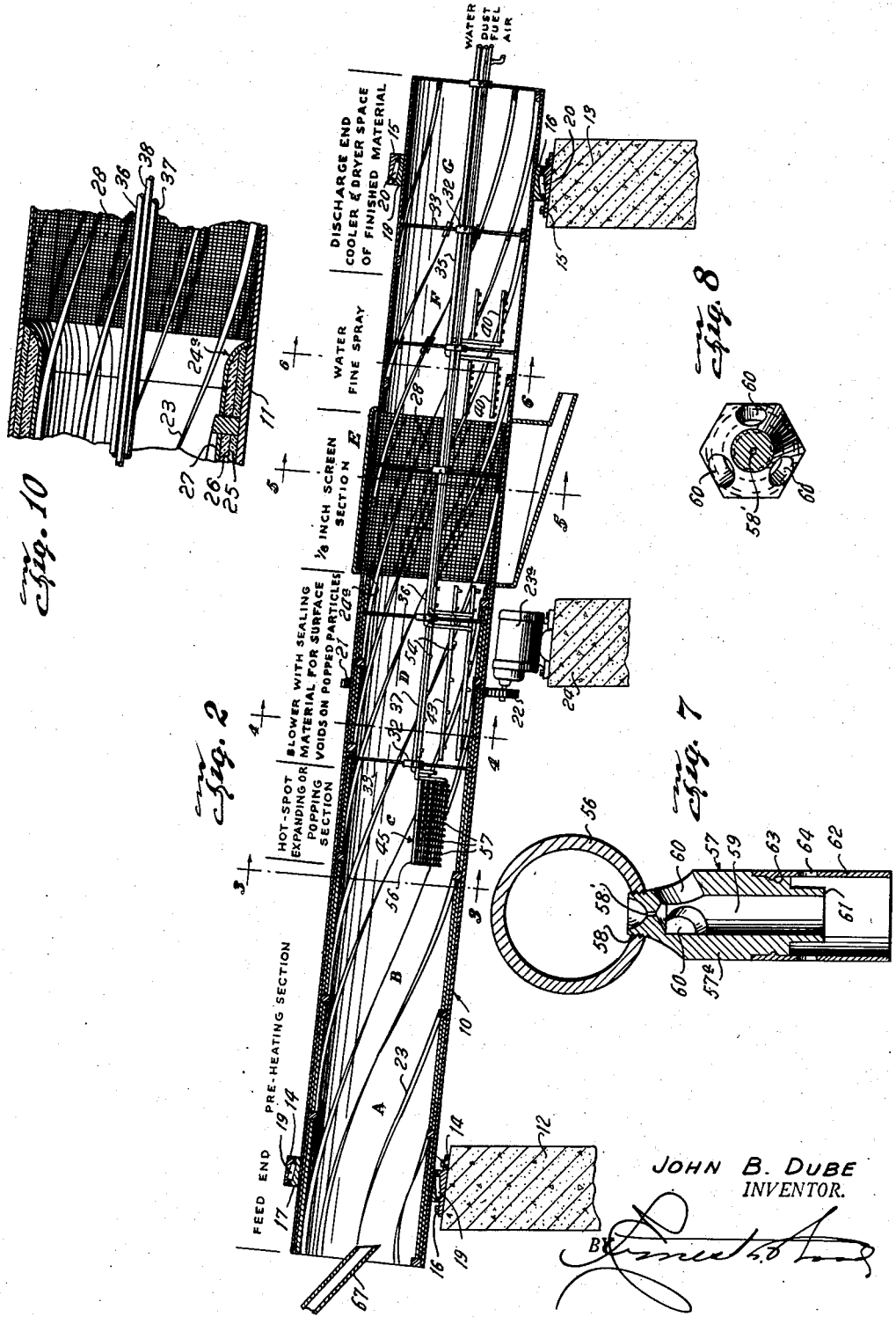
JOHN B. DUBE
INVENTOR.
ATTORNEY

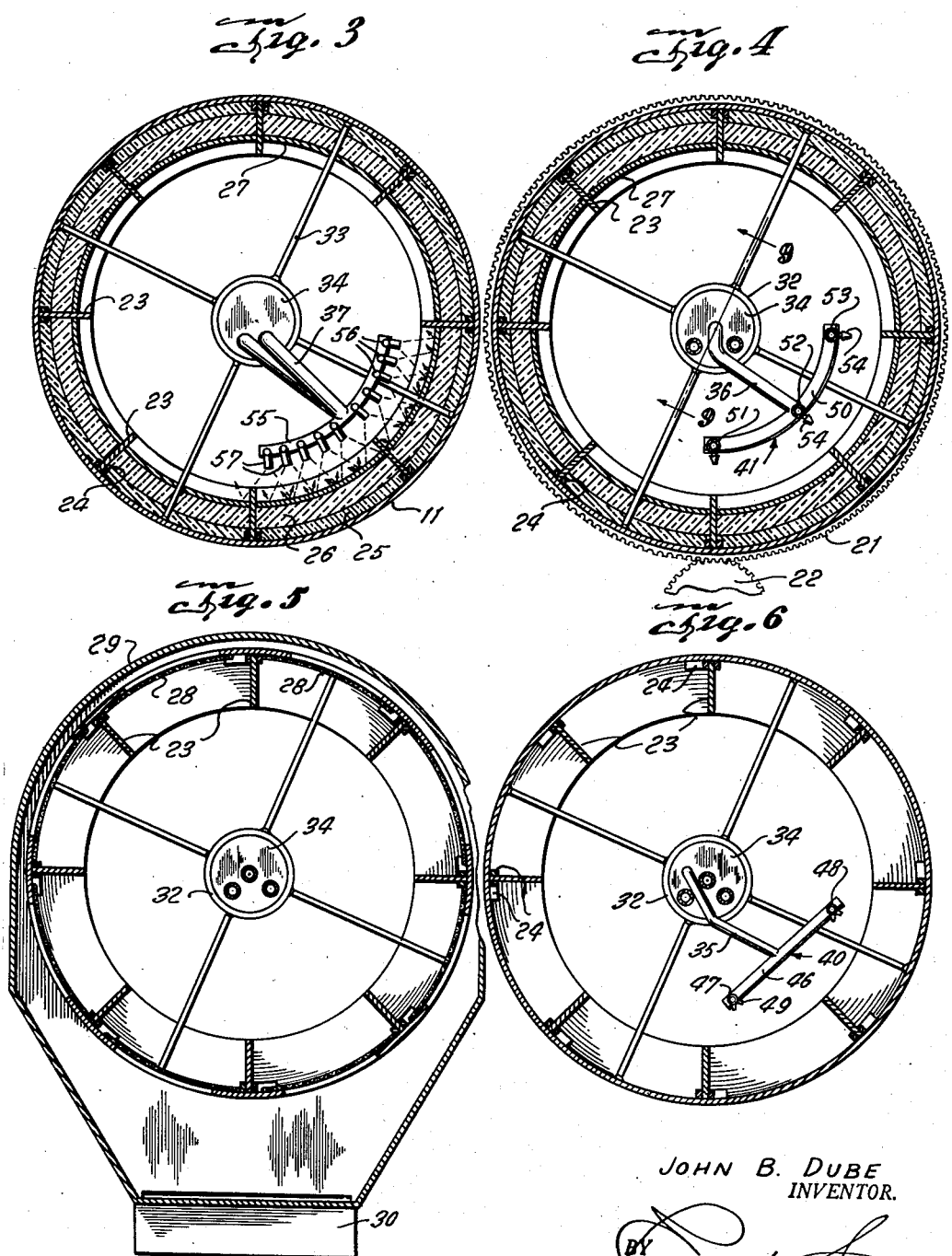

Patented June 16, 1953

2,642,273

UNITED STATES PATENT OFFICE 2,642,273

APPARATUS FOR PRODUCING LIGHT-
WEIGHT AGGREGATES

John B. Dube, Dallas, Tex.

Original application August 23, 1950, Serial No. 181,036. Divided and this application July 5, 1951, Serial No. 235,313

6 Claims. (Cl. 263—33)

This invention relates to methods and means for producing lightweight aggregates and more particularly to a method and means for producing lightweight aggregates by heating argillaceous, siliceous, volcanic or other materials.

This application is a division of my co-pending application Serial No. 181,036, filed August 23, 1950.

Lightweight non-metallic aggregates offer great advantages over ordinary sand and gravel when employed in making concretes, mortars, building blocks, shapes, forms and bricks as well as in many industrial applications because of their unusual lightness and strength, practical inertness to acids, their good insulating, fire resistant and absorbing properties, and their imperviousness to termite or other insect attacks. It is desirable, therefore, that a method and means be provided which will efficiently process argillaceous, siliceous, volcanic material to form lightweight aggregates. The lightweight aggregates formed by the expansion of the treated material are in the form of granules which are vesicular in structure having many voids, some of which extend to the outer surfaces of the granules. It is desirable to seal the voids or openings communicating with the surface of the granules in order to lessen the absorption of water by the granules of the lightweight aggregate. Sealing of the voids of granules of lightweight aggregates leads to the following advantages:

The absorption of water by the lightweight aggregate from the mix in the formation of concretes is decreased, the mix therefore requiring much less water;

The slump of the concrete mix made with the aggregate is decreased;

The degree of expansion and contraction of the set concrete made with the aggregate is decreased;

The weight of the set concrete made with the aggregate is decreased;

The compressive and transversive strength of the set concrete made with the aggregate is increased;

The modulus of elasticity of the concrete made with the aggregate is markedly increased;

The coefficient of thermal conductivity is lowered thereby increasing the heat insulating property of the aggregate;

The concrete made with the aggregate is rendered less susceptible to damage due to freezing and thawing, thus increasing the durability of the concrete; and The concrete mix is made more workable since the cement employed in the mix is permitted to spread quickly and to come into closer contact with the whole surfaces of the granules and the formation of dry spots in the mix is rendered less likely since the absorption of water by the voids in the granules is prevented.

Accordingly, it is an object of my invention to provide a new and improved method and means for producing lightweight aggregates.

It is another object of my invention to provide a new and improved method and means for producing lightweight aggregates by heating argillaceous, siliceous, volcanic or other materials.

It is another object of my invention to provide a new and improved means for producing lightweight aggregates formed of granules of vesicular structure whose voids or openings are sealed.

It is another object of my invention to provide a new and improved method and means for continuous processing of materials to produce lightweight aggregates.

It is another object of my invention to provide a new and improved rotary kiln.

It is still another object of my invention to provide a new and improved kiln for heating materials to produce aggregates formed of vesicular granules, to dust the granules with a cementitious material while the granules are at their greatest degree of expansion, and to spray the dusted granules with water or steam to set or harden the cementitious material sealing the voids.

Briefly stated, my new and improved means for producing lightweight aggregates comprises an inclined cylindrical shell mounted for rotary movement about its central axis. The interior of the shell is provided with a plurality of helical risers which serve to cascade the treated material during its passage from the upper intake end of the shell to the lower discharge end of the shell. The upper section of the shell is lined with heat insulating material which is immediately adjacent a section of the shell which is provided with screens through which fine materials may discharge from the shell. Intermediate the intake end of the shell and the screened section is disposed a flame gun which heats the treated material to a temperature which is intermediate the incipient and complete vitrification temperatures of the treated material. The heat completely dehydrates all moisture in the mass and drives out all gases of constitution, thereby forming myriad voids in the granules of the mass. Positioned between the flame gun and the screen section of the shell is a dust blower while immediately below the screened section is positioned a water sprayer. Pipes are positioned within the shell to provide gas and oxygen or air to the flame gun, dust or power to blower and water to the spray, said pipes being stationarily mounted in the rotatable shell.

The new and improved method of treating raw material to produce lightweight aggregates comprises heating the raw material to a temperature intermediate the incipient and complete vitrification temperatures of the material, to form vesicular granules blowing a dust of cementitious material on the vesicular materials, spraying the dusted granules with water or steam, and continuously cascading the material throughout the above steps of treatment.

For a better understanding of my invention reference may be had to the following description taken in connection with the accompanying drawing and its scope will be pointed out in the appended claims.

Figure 1 is a side elevational view of my new and improved rotary kiln;

Figure 2 is a cross-sectional view of the rotary kiln showing some of its associated structures;

Figure 3 is a cross-sectional view taken along line 3—3 of Figure 2;

Figure 4 is a cross-sectional view taken along line 4—4 of Figure 2;

Figure 5 is a cross-sectional view taken along line 5—5 of Figure 2;

Figure 6 is a cross-sectional view taken along line 6—6 of Figure 2;

Figure 7 is a sectional view of one of the jets of the flame gun;

Figure 8 is a sectional view taken along line 8—8 of Figure 7;

Figure 9 is a fragmentary sectional view taken along line 9—9 of Figure 4; and

Figure 10 is a fragmentary sectional view of the kiln showing an abrasion shield at the terminus of the insulated section of the kiln.

Referring now to the drawing, the rotary kiln 10 of my invention comprises a cylindrical shell 11 which is supported in an elevated inclined position on stands 12 and 13 which may be of concrete. Outer bearing cases 14 and 15 are secured to stands 12 and 13, respectively by means of bolts 16 while inner bearing cases 17 and 18 are rigidly secured to shell 11 adjacent its upper and lower ends respectively. A plurality of roller bearings 19 and 20 are secured between inner and outer cases 14 and 17, and 15 and 18, respectively, and rotatably support shell 11 on stands 12 and 13. A ring gear 21 is rigidly secured about shell 11 intermediate its ends and is in mesh with a pinion gear 22 driven by a motor 23a which is mounted on a stand 24. Motor 23a imparts rotary movement to shell 11 through gears 21 and 22.

A plurality of riser plates 23 are secured to the inner surface of shell 11 by means of lugs 24. Lugs 24 may be rigidly secured to shell 11 by welding as may be secured riser plates 23 to lugs 24. Riser plates 23 extend longitudinally through shell 11 in a spiral or helical fashion, are parallel to each other, and extend inwardly from the inner wall surface of shell 11.

In order to prevent the wearing away of the refractory and insulating liner of the kiln by passage of the material off the end thereof, an annular shield 24a embraces the terminus of the liner (Fig. 10).

The upper portion of shell 11 comprising the sections A, B, C and D is insulated to prevent the passage of heat to the outside of shell 11. The insulation comprises a layer 25 of plastic insulating material which is rammed into place against the inner surface of shell 11 between riser plates 23. A second layer 26 of refractory and insulating material is disposed on layer 24 between riser plates 23 and is in turn covered by a relatively thin layer 27 of graphite which is employed to prevent rapid wear of the refractory material 26 due to the abrasive action of the material passing through shell 11.

Portions of shell 11 between riser plates 23 are removed and the openings are covered by screens 28 which may be secured to shell 11 by welding or in any other conventional manner. The screen section E of shell 11 provided with screens 28 is enclosed by a housing 29 having a discharge spout 30. Housing 29 and spout 30 may be supported by a stand 31, shell 11 being rotatable in housing 29. The sections E, F and G of shell 11 are devoid of any insulation.

A plurality of brace rings 32 are disposed in longitudinally spaced relationship in shell 11 and are secured to shell 11 by means of braces 33 which are secured to shell 11 and brace rings 32 by welding or other conventional means. Disposed within, and supported by, brace rings 32 are stationary disks 34 which are apertured to receive and support water or steam conduit 35, dust conduit 36, fuel conduit 37, and oxygen or air conduit 38.

Water or steam conduit 36 extends between a water pump 39 and a water or steam sprayer 40 disposed in section F of shell 11. Dust conduit 36 extends between a dust blower 41, supplied with dust material from bin 42, and a dust sprayer 43 disposed in section D. Fuel conduit 37 may conduct a fuel in the form of gas or a gas pressure booster or pump 44 and a flame gun 45 disposed in section C of shell 11. Oxygen or air conduit 38 may be connected to any suitable source of oxygen or air under pressure to supply oxygen to flame gun 45.

Water sprayer 40 comprises a transverse conduit 46 secured to and communicating with water conduit 35 and a pair of longitudinally extending conduits 47 and 48 connected with transverse conduit 46. Conduits 47 and 48 are provided with a plurality of spray heads 49. Two or more water sprayers 40 may be connected to water conduit 35.

Dust sprayer 41 comprises an arcuated conduit 50 secured to and communicating with dust conduit 36 and three longitudinally extending conduits 51, 52 and 53 connected to arcuated conduit 50. A plurality of spray heads 54 are connected to each of the conduits 51, 52 and 53. Two or more dust sprayers 41 may be connected to dust conduit 36.

Flame gun 45 comprises an arcuated transversely extending conduit 55 secured to and communicating with fuel conduit 37 and a plurality of longitudinally extending conduits 56 connected to arcuated conduit 55. Each of the conduits 56 is provided with a plurality of jets 57, each having a member 57a provided with a threaded upper end 58 which engages in a suitable threaded opening in its associated conduit 56. The fuel, i. e., gas, flows from each conduit 56 through narrow aperture 58 in each member 57a to an enlarged mixing chamber 59. A plurality of upper apertures 60 also communicate with mixing chamber 59. Air or oxygen is drawn in through apertures 60 when gas flows through aperture 58'. The lower end of member 57a is reduced to form a sleeve 61. A barrel 62 is secured to member 57a by means of a flange 63 which engages in a suitable annular groove in member 57a. The barrel 62 is provided with a plurality of apertures 64 through which air or oxygen is drawn to mix with the mixture of gas and air or oxygen flowing from mixing chamber 59.

In operation, the material to be treated such as crushed shale, clay, vermiculite or other material is lifted by a conveyor into a bin 66 provided with a spout 67. Spout 67 extends into the upper end of shell 11 and the raw material is controlled as it passes into section A of shell 11. Shell 11 is rotated continuously by motor 23a so that riser plates 23 each continuously lifts the raw material deposited in section A and then allows it to cascade down to the bottom of section A of shell 11. The raw material moves toward section B since shell 11 is inclined downwardly from section A. As the raw material travels through section A, the heat produced by flame gun 45 is not completely utilized in sections C and B passes through section A and drives off the surface moisture on the granules of crushed raw material. At the same time it begins to heat the raw material and raise the temperature.

As the raw material moves further down the shell 11 to section B, it is heated still more and moisture of constitution within the granules of raw material is driven off. At the same time the temperature of the raw material is continually raised as it approaches section C. Just before the raw material enters section C, its temperature is raised by the heat absorbed by the raw material to the point where the raw material approaches the explosive, expansive or plastic stage. Gasses forming within the granules of the heated raw material will expand the granules due to the pyro-chemical reaction generated by the radiant energy of the flame.

With the rotating kiln or cylinders set at a predetermined angle of repose on the piers, the risers 23 by virtue of their helical course throughout the kiln, cascade the material and accelerate the travel of the mass throughout the length of the kiln. Depending upon the angle at which the risers 23 are set, and the space between the said risers the material being processed will, first, be cascaded at an angle in the direction in which the mass is travelling, thus materially increasing the speed of the mass coursing down the kiln to the discharge end.

Second, the space between the risers 23 will determine the number of times the entire mass in the kiln will be exposed to the pyro-chemical reaction of radiant energy. These exposures can be two, three or four times per minute, should the revolution of the kiln be one per minute. Should the speed of revolution be increased the speed of the mass travel will likewise be increased and thereby adding to production.

Third, the cascading action of the mass with its many exposures to the radiant energy causes a positively uniform finished product. To the present day, the production of a uniform product is almost impossible due to the travelling mass down the kiln without the use of risers.

Fourth, the use of risers 23 completely eliminates the rising action of the mass to the angle of repose in the kiln and then suddenly causes the mass to slide down on the refractory lining of the kiln, and thereby causes damage due to abrasion.

Fifth, the use of risers 23 further eliminates the formation of a ring in the hot zone of the kiln. These rings are formed by the sliding down of the plastic mass on the refractories. Due to the soft plastic condition of the mass, the sliding down of the heavy mass causes a portion of the plastic material to adhere to the ring formed on the refractories of the hot zone. To clear these rings, stoppage of work are necessary thereby causing much time lost and greatly added expense to production.

With the increase of production and a uniform product with the saving of gas and electricity, the profits of operation will be unquestionably in favor of my new unit of fabrication of lightweight aggregates.

When the preheated material enters into section C, it cascades directly into the radiant energy created by flame produced by flame gun 45. Jets 57 are so arranged that the flame produced by each jet 57 blends with the flames produced by its immediately adjoining jets 57 to produce a wall of flame through which the preheated material cascading off riser plates 23 must travel. The radiant energy developed by the flame is blasted against the granular material and such radiant energy that does not come into contact wtih the granules of the mass rebounds from the refractory lining of the shell and is carried towards the feed end of the kiln to preheat the cascaded material entering the kiln. It will be noted that arcuated conduit 55 is concentric with the curvature of shell 11 and extends upwardly in the direction of rotation of shell 11 so that the preheated material must travel through the wall of flame as it cascades downwardly. As the preheated material travels through the flame, its temperature is raised suddenly to make intermediate its incipient and complete vitrification temperatures and a pyro-chemical reaction takes place in the granules which greatly expands the volume of each granule. Gases formed in the granules during this pyro-chemical reaction seek an outlet and greatly expand the volume of the now plastic granules and cause the granules to have a vesicular structure, some of the gas pockets communicating with the outer surfaces of the granules. As has been implied, not all of the heat generated by the flame gun 45 is absorbed by the material passing through section C of shell 11.

The expanded granules pass from section C to section D where a cementitious dust is blown on the expanded granules by dust sprayers 43. The cementitious dust seals the voids or openings in the expanded granules when the voids are at their greatest degree of expansion so that when the granules contract these will be provided with a solidified surface seal. Conduits 50 of sprayers 43 are so positioned that the dust is blown on the expanded granules as they cascade off riser plates 23.

The expanded granules then pass into section E where the very fine granules and the excess dust drops through the screens 28 into the bottom of housing 29 and fall through spout 30 into a hopper 68 positioned below spout 30.

The larger granules which do not fall through screens 28 pass into section F in which are located water or steam sprayers 40. The water or steam sprayers are so positioned that the expanded granules are exposed to a very fine water or steam spray as they cascade off riser plates 23. The water or steam spray sets or hardens the cementitious dust which has been deposited in the surface voids of the expanded granules in section D. Screens 28 are employed before the water spraying of the expanded and dusted granules in order to prevent the agglomeration of granules which would take place due to the binding action of the excess dust if it were previously sprayed with water.

The expanded granules begin to cool as soon as they pass into section D and continue to cool as they pass through sections E, F and G. Sections E, F, and G have not been provided with insulating material in order that heat may be transferred from the expanded granules to the atmosphere through the metal shell 11 by conduction. In section G, therefore, the expanded granules are further cooled before passing out of shell 11.

It will be noted that throughout its passage through shell 11, the treated material has been continuously cascaded by the action of riser plates 23. This cascading action insures that all granules be exposed to the heat in the preheating sections A and B, to the flame in section C, and to the dust and the water or steam in sections D and F. The cooling off process in sections D, E, F and G and the screening process in Section E is also facilitated by the cascading action.

The speed at which the treated material travels through shell 11 depends on the speed of rotation of shell 11 and the number, spacing, and twist of riser plates 23. It can be seen that by varying any one of the above factors, the speed of travel of the treated material may be controlled.

Shell 11 is made of a heat resistant material. Riser plates 23 and flame gun 45 are made of especially highly heat resistant material since they are raised to very high temperatures. The temperature to which the treated material must be heated to obtain the desired expansion of the granules varies with the type of raw material employed. The temperature can be controlled by controlling the amount of fuel, gas, supplied to flame gun 45.

After passing through shell 11, the expanded granules drop onto a course screen 69. The larger granules cannot pass through screen 69 and therefore descend on a chute 70 to a bin 71. The granules that drop through screen 69 fall on a screen 72 positioned below screen 69. Medium sized granules cannot pass through screen 72 and descend on a chute 73 to a bin 74. The fine granules and any remaining dust fall through screen 72 into a bin 75. Screens 69 and 70 and bins 68, 71, 74 and 75 are supported above the ground by any conventional studs or supports so that the expanded granules may be delivered directly from the bins into trucks or other transporting means.

While I have described and illustrated a preferred embodiment and example of my invention, it will be obvious that changes and modifications can be made without departing from my invention and I, therefore aim in the appended claims to cover all such changes or modification as fall within the true spirit and scope of my invention.

What is claimed is:

1. A rotary kiln comprising: an inclined rotary cylinder having at least its upper end open; a lining of heat insulating material within and secured to said cylinder extending from the upper end of said cylinder to a point intermediate said upper and lower ends; a plurality of spirally arranged risers extending inwardly of said lining within said cylinder and from the upper ends to the lower end of the cylinder and secured to said cylinder; a burner disposed within said cylinder for heating a section of said cylinder lying intermediate said upper end and said point; a dust sprayer disposed immediately adjacent to said burner within said cylinder intermediate said heated section and said lower end; and a water sprayer disposed within said cylinder between said dust sprayer and said lower end.

2. A rotary kiln comprising: an inclined rotary cylinder having an open upper end; a lining of heat insulating material within and secured to said cylinder extending from the upper end of said cylinder to a point intermediate said upper and lower ends; a plurality of spirally arranged risers extending inwardly of said lining within said cylinder and secured to said cylinder; a burner disposed within said cylinder for heating a section of said cylinder lying intermediate said upper end and said point; a dust sprayer in juxtaposition with said burner and disposed within said cylinder intermediate said heated section and said lower end; a water sprayer disposed within said cylinder between said dust sprayer and said lower end, said cylinder being provided with a plurality of openings between said risers and between said dust and water sprayers; and screen means covering each of said openings.

3. A rotary kiln comprising an inclined rotary cylinder having an open upper end for receiving a granular material and open lower end for discharging said granular material; a lining of heat insulating material within and secured to said cylinder extending from said upper end to a point intermediate said ends; a plurality of spirally arranged risers extending inwardly of said lining within said cylinder and secured to said cylinder for cascading said granular material as said cylinder rotates; a burner disposed within said cylinder for heating a section of said cylinder lying intermediate said upper end and said point and heating said granular material cascading through said heating section to a temperature intermediate its incipient and complete vitrification temperatures, and expanding the granules of said granular material, excess heat generated by said burner passing to a section intermediate said heating section and said upper end to preheat granular material cascading toward said heating section; a dust sprayer in juxtaposition with said burner and disposed within said cylinder intermediate said lower end and said heating section for filling surface voids of the cascading expanded granules with a cementitious material; and a water sprayer disposed within said cylinder between said dust sprayer and said lower end for treating the cascading expanded and dusted granules with water to set said cementitious material in said voids.

4. A rotary kiln comprising an inclined rotary cylinder having an open upper end for receiving a granular material and open lower end for discharging said granular material; a lining of heat insulating material within and secured to said cylinder extending from said upper end to a point intermediate said ends; a plurality of spirally arranged risers extending inwardly of said lining within said cylinder and secured to said cylinder for cascading said granular material as said cylinder rotates; a burner disposed within said cylinder for heating a section of said cylinder lying intermediate said upper end and said point and heating said granular material cascading through said heating section to a temperature intermediate its incipient and complete vitrification temperatures, and expanding the granules of said granular material, excess heat generated by said burner passing to a section intermediate said heating section and said upper end to preheat granular material cascading and traveling toward said heating section; a dust sprayer disposed immediately adjacent to said burner within said cylinder intermediate said lower end and said heating section for filling surface voids of the cascading expanded granules with a cementitious material; a water sprayer disposed within said cylinder between said dust sprayer and said lower end for treating the cascading, expanded and dusted granules with water to set said cementitious material in said surface voids, said cylinder being provided with a plurality of openings between said risers and between said dust and water sprayers; and screen means covering each of said openings adapted to remove excess dust and fine granules from the cascading material passing toward said water sprayer.

5. A rotary kiln comprising an inclined rotary cylinder having an open upper end for receiving a granular material and open lower end for discharging said granular material; a lining of heat insulating material within and secured to the inner wall surface of said cylinder extending from said upper end to a point intermediate said ends; a plurality of spirally arranged risers extending inwardly of said lining within said cylinder and secured to said cylinder inner wall surface for cascading said granular material as said cylinder rotates; a flame gun disposed within said cylinder for heating a section of said cylinder lying intermediate said upper end and said point, said flame gun producing a wall of flame in the path of the cascading granular material for heating the cascading granular material to a temperature intermediate its incipient and complete vitrification temperatures and expanding the granules of said granular material; a dust sprayer disposed immediately adjacent to said burner within said cylinder between said lower end and said heating section for filling surface voids of said granules cascaded by said risers with cementitious dust; and a water sprayer disposed within said cylinder between said dust sprayer and said lower end for treating the cascading expanded and dusted granules with water to set said cementitious material in said surface voids.

6. A rotary kiln comprising an inclined rotary cylinder having an open upper end for receiving a granular material and open lower end for discharging said granular material; a lining of heat insulating material within and secured to said cylinder extending from said upper end to a point intermediate said ends; a plurality of spirally arranged risers extending inwardly of said lining within said cylinder and secured to said cylinder for cascading said granular material as said cylinder rotates; a flame gun disposed within said cylinder for heating a section of said cylinder lying intermediate said upper end and said point, said flame gun producing a wall of flame in the path of the cascading granular material for heating the cascading granular material to a temperature intermediate its incipient and complete vitrification temperatures and expanding the granules of said granular material; a dust sprayer in juxtaposition with said burner and disposed between the lower end of said cylinder and said heating section adapted to fill surface voids of said granules with a cementitious material; a water sprayer disposed within said cylinder between said dust sprayer and said lower end for treating the cascading, expanded and dusted granules with water to set said cementitious material in said surface voids, said cylinder being provided with a plurality of openings between said risers and between said dust and water sprayers; and screen means covering each of said openings removing excess dust and fine granules from the cascading material passing toward said water sprayer.

JOHN B. DUBE.

References Cited in the file of this patent

UNITED STATES PATENTS

| Number | Name | Date |
|---|---|---|
| 1,866,203 | Foilliet et al. | July 5, 1932 |
| 1,892,271 | Hart | Dec. 27, 1932 |
| 2,052,329 | Wendeborn | Aug. 25, 1936 |
| 2,501,962 | Pierce | Mar. 28, 1950 |
| 2,543,898 | DeVaney | Mar. 5, 1951 |

FOREIGN PATENTS

| Number | Country | Date |
|---|---|---|
| 406,530 | Great Britain | Mar. 1, 1934 |